US008943400B2

(12) United States Patent
Tanaka et al.

(10) Patent No.: US 8,943,400 B2
(45) Date of Patent: Jan. 27, 2015

(54) DOCUMENT PROCESSING APPARATUS, DOCUMENT PROCESSING METHOD AND STORAGE MEDIUM STORING DOCUMENT PROCESSING PROGRAM

(75) Inventors: Kei Tanaka, Ashigarakami-gun (JP); Nobuyuki Takeo, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 909 days.

(21) Appl. No.: 13/151,963

(22) Filed: Jun. 2, 2011

(65) Prior Publication Data

US 2011/0239102 A1 Sep. 29, 2011

Related U.S. Application Data

(62) Division of application No. 11/073,583, filed on Mar. 8, 2005.

(30) Foreign Application Priority Data

Jul. 14, 2004 (JP) .................................. 2004-207822

(51) Int. Cl.
*G06F 3/00* (2006.01)
*G06F 17/24* (2006.01)

(52) U.S. Cl.
CPC .................................. *G06F 17/241* (2013.01)
USPC ........................................................ 715/230

(58) Field of Classification Search
USPC .......................... 715/234, 243, 254, 255, 230
See application file for complete search history.

(56) References Cited

U.S. PATENT DOCUMENTS

| 5,615,325 | A | 3/1997 | Peden |
| 6,687,876 | B1 | 2/2004 | Schilit et al. |
| 7,194,679 | B1 | 3/2007 | Green |
| 2002/0078071 | A1 | 6/2002 | Foster |
| 2003/0200093 | A1 | 10/2003 | Lewis et al. |
| 2004/0003352 | A1 | 1/2004 | Bargeron |
| 2004/0088332 | A1 | 5/2004 | Lee et al. |
| 2005/0053283 | A1 | 3/2005 | Wakeam et al. |
| 2005/0160356 | A1 | 7/2005 | Albornoz et al. |
| 2005/0228983 | A1 | 10/2005 | Starbuck et al. |
| 2006/0004526 | A1 | 1/2006 | Hadd |
| 2007/0118794 | A1* | 5/2007 | Hollander et al. ............ 715/512 |

FOREIGN PATENT DOCUMENTS

| JP | 5113975 A | 5/1993 |
| JP | 2002140344 A | 5/2002 |

OTHER PUBLICATIONS

Charles Rubin, et al., Unizon Corporation, Eds., "Microsoft Office Word 2003 Official Manual," 1st edition, Nikkei BP Soft Press, Jul. 12, 2004, pp. 801-812.

\* cited by examiner

*Primary Examiner* — Kyle Stork
(74) *Attorney, Agent, or Firm* — Sughrue Mion, PLLC

(57) ABSTRACT

A document processing apparatus has an attachment unit and a storage. The attachment unit attaches a comment to an electronic document as additional information. The comment relates to a modification of the electronic document. The storage associates the comment with modified place information and stores them. The modified place information indicates a modified place of the electronic document, when the electronic document is modified based on the comment.

6 Claims, 12 Drawing Sheets

DOCUMENT DATABASE DB1

| DOCUMENT ID | DOCUMENT NAME | DOCUMENT MAIN BODY |
|---|---|---|
| 0000 | doc001.txt | FIRST. ······ |
| 0001 | doc002.txt | THIS MATERIAL IS ······ |
| 0002 | doc003.txt | BUDGET OF THIS YEAR ······ |
| · | · | · |
| · | · | · |
| · | · | · |

DOCUMENT DATABASE DB1

| DOCUMENT ID | DOCUMENT NAME | DOCUMENT MAIN BODY |
|---|---|---|
| 0000 | doc001.txt | FIRST. ······ |
| 0001 | doc002.txt | THIS MATERIAL IS ······ |
| 0002 | doc003.txt | BUDGET OF THIS YEAR ······ |
| ⋮ | ⋮ | ⋮ |

FIG. 4

TAG ANNOTATION DATABASE DB2

| ANNOTATION ID | TERMINAL ID | USER ID | DOCUMENT ID | POSITION INFORMATION | LINK DESTINATION | OPEN ATTRIBUTE | STATUS | CREATION TIME | EDIT INFORMATION |
|---|---|---|---|---|---|---|---|---|---|
| 0001 | 0011 | User1 | 0002 | p1 520–670 | http://MessageServer/threadViewer?MessageId=1517 | Frd | Exist | 2004/03/3 19:10:15 | ... |
| 0002 | 0012 | User2 | 0002 | p2 1030–1180 | http://MessageServer/threadViewer?MessageId=1518 | Frd | Exist | 2004/03/3 17:25:45 | ... |
| 0003 | 0012 | User2 | 0002 | p3 1740–1890 | http://MessageServer/threadViewer?MessageId=1519 | Frd | Exist | 2004/03/3 18:18:23 | ... |
| ... | ... | ... | ... | ... | ... | ... | ... | ... | ... |

EDIT INFORMATION

| REFERENCE CHECK | MODIFICATION RELEVANT INFORMATION |
|---|---|
| C | mod (1.5.0.7. outline, OUTLINE) |
| C | mod (2.7.5.7. SUMMARY, MAIN POINT) |
| – | – |
| ... | ... |

FIG. 5

PEN INPUT ANNOTATION DATABASE DB3

| ANNOTATION ID | TERMINAL ID | USER ID | DOCUMENT ID | POSITION INFORMATION | ANNOTATION CONTENT | COLOR SHAPE | KIND OF LINE | OPEN ATTRIBUTE | STATUS | CREATION TIME |
|---|---|---|---|---|---|---|---|---|---|---|
| 0101 | 0011 | User1 | 0002 | p1 1410–1515 | IMAGE INFORMATION 1 | RED SQUARE | THIN 1 | Frd | Deleted | 2004/03/5 19:25:35 |
| 0102 | 0012 | User2 | 0002 | p1 1620–1770 | IMAGE INFORMATION 2 | YELLOW | EXTRA THICK 1 | Priv | Exist | 2004/03/6 12:18:11 |
| 0103 | 0012 | User2 | 0002 | p3 568–722 | IMAGE INFORMATION 3 | YELLOW | EXTRA THICK 1 | Priv | Exist | 2004/03/6 13:23:45 |
| ... | ... | ... | ... | ... | ... | ... | ... | ... | ... | ... |

FIG. 6

MESSAGE DATABASE DB4

| MESSAGE ID | UPDATE TIME | IMMEDIATELY PRECEDING MESSAGE ID | IMMEDIATELY FOLLOWING MESSAGE ID | TITLE | MESSAGE |
|---|---|---|---|---|---|
| 1517 | 2004/03/4 10:10:15 | 0 | 1520 | CONTENTS OF INTRODUCTION | ... |
| 1518 | 2004/03/4 10:20:15 | 0 | 1521 | OBSCURE EXPRESSION | ... |
| 1519 | 2004/03/4 10:30:15 | 0 | 0 | UNNECESSARY SENTENCE | ... |
| 1520 | 2004/03/4 20:50:25 | 1517 | 0 | RE: CONTENTS OF INTRODUCTION | ... |
| 1521 | 2004/03/4 20:50:25 | 1518 | 0 | RE: OBSCURE EXPRESSION | ... |

DOCUMENT PROCESSING APPARATUS, DOCUMENT PROCESSING METHOD AND STORAGE MEDIUM STORING DOCUMENT PROCESSING PROGRAM

CROSS REFERENCE TO RELATED APPLICATIONS

This application is a divisional of U.S. patent application Ser. No. 11/073,583, filed Mar. 8, 2005, which claims priority to Japanese Patent Application No. 2004-207822, filed Jul. 14, 2004, the contents of all of which are incorporated herein by reference.

BACKGROUND OF THE INVENTION (1) Field of the Invention

The present invention relates to a document processing apparatus, a document processing method, and a storage medium storing a document processing program, and more particularly to a document processing apparatus capable of editing an electronic document, a document processing method in the document processing apparatus, and a storage medium storing a document processing program executable in the document processing apparatus.

(2) Description of the Related Art

In recent years, there are some types of document processing systems in which plural persons or groups create a document jointly, and each person can use the document. For example, there is a system in which version control of a created document can be performed, and also a system in which a comment of an author can be added to a created document, or the like.

However, in these conventional systems, the version information of the revised document and the comment added to the document are separately managed with the document.

Thus, when a document is revised, another person can not understand a reason of the revision because a comment of the reason is not associated with the document. Also, when the comment is added to the document, it is difficult to known how the comment is finally reflected on the revision.

There is a technique which connects a comment of a document and the document according to JP-A-5-113975. In the related art, since the document and the comment are associated with each other, the contents of the comment on the document can be grasped. However, when there are plural modifications on a document, a corresponding relation between the comment and a modified place from the old version to the new version is not clear, so it is not easy to grasp a reason for modification of each of the modified places.

SUMMARY OF THE INVENTION

The present invention has been made in view of the above circumstances and provides a document processing apparatus, a document processing method and a storage medium storing a document processing program, in which a reason for modification of a document can be easily grasped.

According to an aspect of the present invention, the document processing apparatus includes an attachment unit that attaches, as additional information, a comment relating to a modification of a part of contents of an electronic document to the electronic document as a processing object, and a storage unit that and associates, in a case where the part of the contents in the electronic document is modified in light of the comment, modified place information indicating a modified place with the comment and stores them.

BRIEF DESCRIPTION OF THE DRAWINGS

Embodiments of the invention will be described in detail based on the following figures, wherein:

FIG. 4 is a schematic diagram showing an example of a data structure of a label annotation database according to an embodiment;

FIG. 5 is a schematic diagram showing an example of a data structure of a pen input annotation database according to an embodiment;

FIG. 6 is a schematic diagram showing an example of a data structure of a message database according to an embodiment;

DETAILED DESCRIPTION OF THE INVENTION

Hereinafter, embodiments of the present invention will be described in detail with reference to the drawings.

Figure 1:
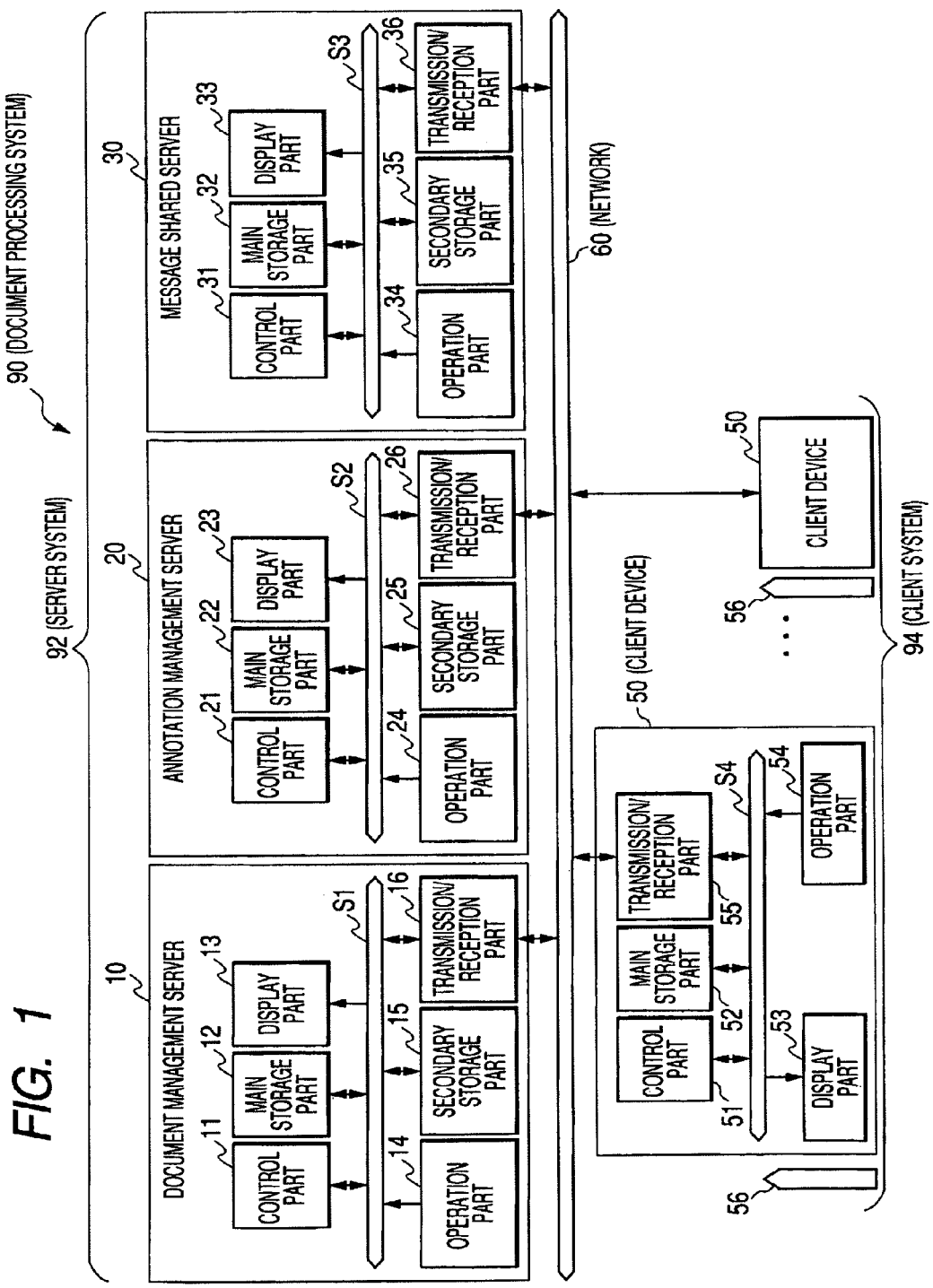
FIG. 1 is a schematic view showing a whole structure of a document processing system according to an embodiment.

FIG. 1 is a view showing a whole rough structure of a document processing system 90 according to an embodiment.

As shown in the figure, the document processing system 90 includes a server system 92 to process electronic data (which is not limited to document data, but includes all other electronic data supported by the document processing system 90), and a client system 94 used by a user of the document processing system 90.

The server system 92 includes a document management server 10 to manage an electronic document (hereinafter, sometimes simply referred to as a "document"), and an annotation management server 20 to manage an annotation. The document management server 10 is a server to mainly store and retrieve documents, and the annotation management server 20 is a server to mainly store and retrieve annotations attached to documents.

By providing the document management server 10 to manage all documents, and the annotation management server 20 to manage the annotations attached to the electronic documents, the user finds no discrepancy in the contents of the final document or corrections on the document, when the corrections on the document is performed by plural users.

For example, even in a case where a user adds a supplemental explanation as an annotation to a portion of an original of an electronic document, and another user adds a correction to delete the same portion, those edited portions are made to correspond to the electronic document main body managed by the document processing server 10 and are registered by the annotation management server 20, so that the management of information can be performed without causing a contradiction in the electronic document main body and the contents of the corrections corresponding thereto.

As shown in the figure, the document management server 10 includes a control part 11 to control the whole operation of the document management server 10, a main storage part 12 to store various pieces of information, a display part 13 constructed to include a display such as a liquid crystal display, an operation part 14 constructed to include a keyboard and a mouse (pointing device), a secondary storage part 15 to store an after-mentioned document database DB1, various programs, various pieces of parameter information and the like, and a transmission/reception part 16 to control giving/receiving of various pieces of information to/from an external device, and these parts are electrically connected to each other through a system bus S1. In this embodiment, the document management server 10 of this embodiment is configured by a normal personal computer (hereinafter sometimes referred to as a "PC").

The annotation management server 20 also includes a control part 21 to control the whole operation of the annotation management server 20, a main storage part 22 to store various pieces of information, a display part 23 constructed to include a display such as a liquid crystal display, an operation part 24 constructed to include a keyboard and a mouse, a secondary storage part 25 to store an after-mentioned label annotation database DB2, a pen input annotation database DB3, various programs, various pieces of parameter information and the like, and a transmission/reception part 26 to control giving/receiving of various pieces of information to/from an external device, and these are electrically connected to each other through a system bus S2. In this embodiment, the annotation management server 20 according to this embodiment is also configured by a normal PC.

Besides, the server system 92 of this embodiment includes a message shared server 30 functioning as a bulletin board system. The message shared server 30 is a server to mainly perform storage and retrieval of messages exchanged on the bulletin board system.

As shown in the figure, the message shared server 30 also includes a control part 31 to control the whole operation of the message shared server 30, a main storage part 32 to store various pieces of information, a display part 33 constructed to include a display such as a liquid crystal display, an operation part 34 constructed to include a keyboard and a mouse, a secondary storage part 35 to store an after-mentioned message database DB4, various programs, various pieces of parameter information and the like, and a transmission/reception part 36 to control giving/receiving of various pieces of information to/from an external device, and these parts are electrically connected to each other through a system bus S3.

In this embodiment, the message shared server 30 of this embodiment is also constructed by a normal PC.

The client system 94 includes a client device 50 provided for each of users of the document processing system 90, and a pen-type annotation device 56 used when pen input is performed to the client device 50.

As shown in the figure, the client device 50 includes a control part 51 to control the whole operation of the client device 50, a main storage part 52 to store various pieces of information, a display part 53 constructed to include a display, an operation part 54 constructed to include a keyboard and a mouse, and a transmission/reception part 55 to control giving/receiving of various pieces of information to/from an external device, and these parts are electrically connected to each other through a system bus S4.

The client device 50 is constructed to display an image on the display part 53 on the basis of data read out from the main storage part 52, and data acquired from the server system 92 through the transmission/reception part 55.

Incidentally, the client device 50 of this embodiment is configured as a tablet PC adopting the display part 53 provided with a touch panel display constructed in such a manner that a touch panel (not shown) is superposed on a display surface, and the display surface of the display part 53 can be directly indicated (handwritten input) by the annotation device 56.

Here, as controllers supporting the handwritten input, any controllers may be used as long as they are for recognizing data inputted by handwriting as "digital ink (handwritten character)" and processing it, and it is not always necessary to have a function (handwritten character recognition function) to convert handwritten data into text. Also in this case, the data can be dealt with as a highest format of a text, and can be directly retrieved as the handwritten character, or the character can be processed (color change or the like). Incidentally, the digital ink data format may be dealt with as image data (for example, bit map data).

When a paper document is read, an underline or a mark such as a circle in favorite form is attached to the document and comments are inserted in the document, the client device 50 enables writing input by using the annotation device 56.

As mentioned above, the client device 50 has the handwritten input function using the annotation device 56. In addition, the client device 50 has a label attachment function capable of producing a label with a specified shape (rectangle in this embodiment) at a position of the document when the document is displayed by the display part 53. Here, a comment can be directly described in the label, or the label can be associated with link information indicating a link destination or a comment or the like. When the label is associated with the link information, information of the link destination indicated by the link information is displayed on the label. In embodiment, the label attached to the document by the label attachment function is the annotation.

As mentioned above, similarly to the case where when a paper document is read, a label is attached to the document, the client device 50 can produce such a state that a label is attached to an arbitrary place such as a place to be noted or a place requiring a supplemental explanation.

The document processing system 90 is configured such that the document processing server 10, the annotation management server 20, the message shared server 30, and the plural client devices 50 are electrically connected to each other through transmission/reception parts respectively provided therein and through a network 60. In the document processing system 90 of this embodiment, although the Internet is applied as the network 60, the invention is not limited to this, and various networks such as an intranet, a LAN (Local Area Network), a VAN (Value Added Network), a telephone circuit network, an echonet (ECHONET), and a HomePNA can also be applied singly or in combination.

In the embodiment, the document management server 10, the annotation management server 20, and the message shared server 30 function as HTTP (Hypertext Transfer Protocol) servers, and each of the client devices 50 functions as an HTTP client. The document management server 10, the annotation management server 20, the message shared server 30, and the client devices 50 can be mutually accessed through the network 60.

In the client device 50, information relating to an annotation (hereinafter, also referred to as a "handwritten annotation") handwritten by using the annotation device 56 or an annotation (hereinafter, also referred to as a "label annotation") attached as a label is once stored in the main storage part 52, and then is transmitted to the annotation management server 20 at a predetermined timing through the network 60, and is made to correspond to a document main body and is stored. When the document is readout later in the client device 50, the information relating to the annotation added in the past, together with the document main body, is also read out and is displayed by the display part 53.

Figures 2, 3:
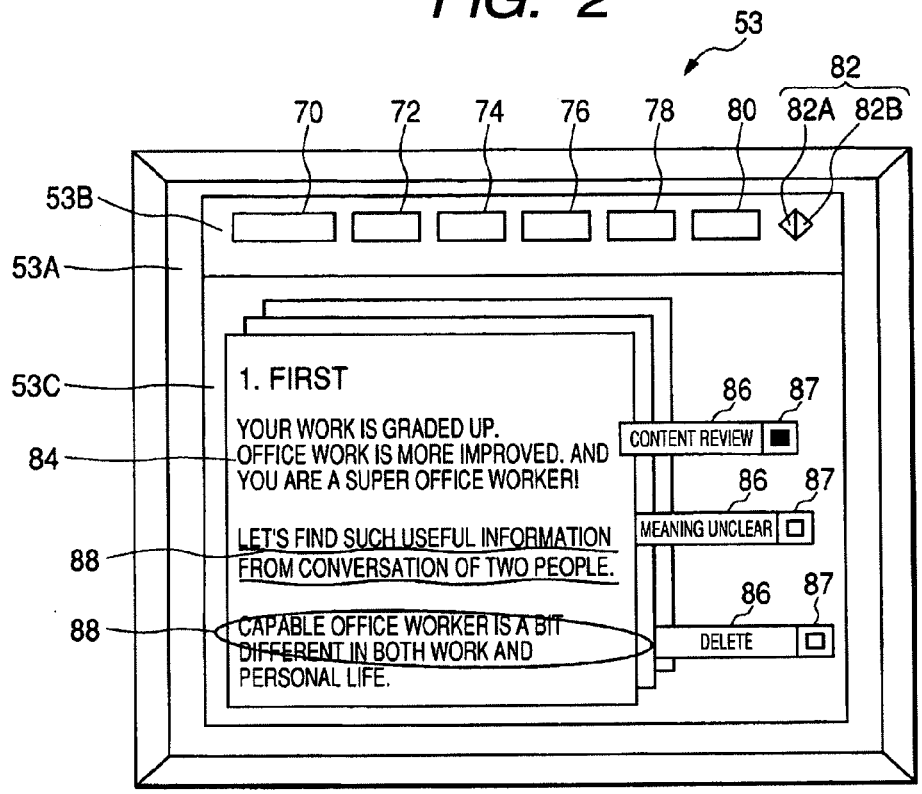
FIG. 2 is a schematic view showing a structural example of a display screen relating to the attachment of an annotation by a display part of a client device according to an embodiment.
FIG. 3 is a schematic diagram showing an example of a data structure of a document database according to an embodiment.

FIG. 2 is a view showing a rough structure of a display screen relating to the attachment of an annotation by the display part 53 of the client device 50 of this embodiment.

As shown in the figure, in a display area 53A of the display part 53 of the client device 50, there are a button display area 53B as an area in which plural buttons respectively having specified roles are displayed, and a document display area 53C as an area in which a document 84 as an attachment object of an annotation is displayed.

In the client device 50 of this embodiment, as the plural buttons, there are displayed, in the button display area 53B, a document read button 70 designated when a document managed (stored) in the document management server 10 is read, a label button 72 designated when a label annotation is attached to a document, a storage button 74 designated when a label annotation 86 or a handwritten input annotation 88 displayed on the document display area 53C is stored, and a retrieval button 76 designated when an annotation managed (stored) in the annotation management server 20 is retrieved and is displayed on the document display area 53C.

Besides, as the plural buttons, there are displayed, in the button display area 53B, an update button 78 designated when display contents of the document display area 53C are updated, a user button 80 designated when a list of users having added annotations to the document displayed on the document display area 53C is displayed, and a page scrolling button 82 including a former page feed button 82A and a next page feed button 82B and for scrolling a page of a displayed document.

The client device 50 has a function (page scrolling display function) to change the display in page units while a page is scrolled like the reading of a book, and is configured such that for example, desired information can be quickly retrieved from a lot of captured information by using this page scrolling display function.

That is, at the time of information retrieval in the client device 50, the two buttons of the former page feed button 82A and the next page feed button 82B are designated by pointing with the annotation device 56, or the keyboard or mouse of the operation part 54, so that the desired page information can be displayed on the display part 53 while the page scrolling operation is performed.

Also, in the client device 50, the function assigned to the button can be executed by pointing designation with the annotation device 56, or the keyboard or mouse of the operation part 54.

As described above, in the client device 50 of this embodiment, the buttons to execute various functions are provided in software by displaying them in the display area 53A of the display part 53. However, it is needless to say that instead of this, a mode can be adopted in which hardware buttons are provided in the display part 53 or the operation part 54, or designated keys of the keyboard of the operation part 54 are used as the respective buttons.

On the other hand, in the document processing system 90 of this embodiment, as shown in FIG. 2, the label annotation 86 in which a link is provided, is constructed such that a reference check mark 87 is displayed. The reference check mark is checked in the case where information of the link destination is information relating to the modification of a part of the contents of the electronic document to which the label annotation is attached, and in the case where the part of the contents of the electronic document is modified in light of this information. When the user refers to the information of the link destination and modifies the contents of the electronic document, the corresponding reference check mark 87 is designated (checked) by pointing it with the annotation device 56, or the keyboard or mouse of the operation part 54. In response thereto, there occurs a state indicating that the display state of the reference check mark 87 is checked (in the example shown in FIG. 2, the state in which the check mark is filled in with black).

Incidentally, an application program (hereinafter referred to as a "document editing AP") for document edit is installed in the client device 50 of this embodiment. When an electronic document is edited, the document editing AP is executed, so that the edit operation is performed, while a document edit screen (not shown) in a state where the electronic document as an edit object is displayed, is displayed in the display area 53A of the display part 53.

The client device 50 is configured such that plural screens can be displayed in the display area 53A. In the case where the edit operation of the electronic document is performed while referring to the annotation attached to the electronic document, both the document edit screen by the document editing AP and the display screen relating to the attachment of the annotation, which is shown in FIG. 2 as an example, are displayed in the display area 53A and the edit operation is performed.

The document management server 10 of this embodiment receives instructions for "registration" and "document read" from the outside.

The "registration" is a path indicating an address of a document storage destination to the document database DB1, such as an URL (Uniform Resource Locators) to a document desired to be registered, or a path to a directory, or the like and is given from the outside.

The document management server 10 gives a document ID sequentially to a document (group) indicated by a given path, and registers a document name and a document main body into the document database DB1 for each document ID. At this time, the data structure in the document database DB1 becomes as shown in FIG. 3 as an example. Here, the document name or the document main body may be a path to a document, such as an URL.

When it is detected that the document read button 70 is designated in one of the client devices 50, the client device 50 notifies the document management server 10 of information to that effect. In response thereto, the document management server 10 creates a list of document names in the document database DB1, and transmits it to the client device 50 as the access origin.

In response thereto, the client device 50 displays the list of document names in a list box or the like, and urges the user to select. when a desired document name is designated by pointing it with the annotation device 56 or the keyboard or mouse of the operation part 54, the client device transmits the designated document name to the document management server 10.

The document management server 10 reads out the document main body and the document ID, which correspond to the document name received from the client device 50, from the document database DB1, and transmits them to the client device 50. Therefore, the main body of the document corresponding to the designated document name is displayed in the document display area 53C of the display part 53 of the client device 50.

On the other hand, the annotation management server 20 of this embodiment receives instructions "storage" and "retrieval" from the outside.

That is, in a state where a document is displayed by the display part 53 in one of the client devices 50, when it is detected that an annotation is attached to the document and the storage button 74 is designated, the client device 50 notifies the annotation management server 20 of information to that effect. By this, the annotation management server 20 causes the information relating to the annotation, which is instructed to be stored, to correspond to the document to which the annotation is attached, and registers (stores) it into the label annotation database DB2 in the case where the annotation is the label annotation or into the pen input annotation database DB3 in the case where the annotation is the handwritten input annotation.

For example, when the annotation management server 20 receives the instruction of "storage" from one of the client devices 50, in the case where the annotation as the storage object is the label annotation, the registration processing of the annotation is performed as described below.

First, the annotation management server 20 is given, from the client device 50, position information indicating a position where an annotation as a storage object is attached, a link destination in the case where a link is provided for the annotation, a document ID of a document to which the annotation is attached, and a terminal ID of the client device 50 having issued the instruction of the storage. At this time, a user name (or user ID) of a user having attached the annotation as the storage object, an open attribute relating to the annotation, a status indicating the state (new, existing, delete) of the annotation, and a time when the annotation is attached are also given from the client device 50.

The annotation management server 20 stores the annotation ID, the terminal ID, the user ID (or user name), the document ID, the position information, the link destination, the open attribute, the status, and the creation time into the label annotation database DB2 in a table form.

Incidentally, in the document management system 90 of this embodiment, with respect to the label annotation in which a link is provided, in the case where the information of the link destination is information (for example, information instructing the modification, information instructing the review of the modification, etc.) relating to the modification of a part of the contents of the electronic document to which the label annotation is attached, and in the case where the part of the contents of the electronic document is modified in light of the information, modification relevant information indicating the modified place and modification contents is given from the client device 50, and is stored in the label annotation database DB2.

The data structure in the label annotation database DB2 is as shown in FIG. 4 as an example.

The annotation ID is for managing respective annotations, and a unique ID number is assigned to each annotation of one label. Here, there is a system in which the annotation ID is issued at the side of the client system 94 or a system in which it is issued at the side of the annotation management server 20. It is necessary that at least a pair of the annotation ID and the document ID is unique. When a given annotation ID or the pair of two is not new, a line indicated by the annotation ID or the pair of two is overwritten.

The terminal ID is an ID number by which the client device 50 is uniquely identified. Here, the terminal ID may directly indicate the hardware of the client device 50 used by the user, or may correspond to an IP (Internet Protocol) address or a host name. The user ID (or user name) is information to uniquely identify the user operating the client device 50, and corresponds to, for example, a log-in user name. Further, the document ID is a unique ID number assigned to each document stored in the document database DB1. Here, in the document processing system 90 of this embodiment, it is assumed that even if the document file name is the same, if the document is entered in the document database DB1 plural times, it is registered to have a different document ID.

On the other hand, the position information is information indicating the given position (attachment position) of the annotation. In this embodiment, the position information is indicated by a combination of a page number in the document indicated by the corresponding document ID and position coordinates (here, coordinates of two points of an upper left corner point and a lower right corner point) on the page indicated by the page number. Incidentally, in this embodiment, the document display area 53C is divided in a matrix form and into rectangular areas each having a size (here, 1/50 (fiftieth) of a horizontal size of the display document in the horizontal direction and 1/60 (sixtieth) of the vertical direction size of the display document in the vertical direction) based on the horizontal size and the vertical size of a document displayed on the document display area 53C, and continuous numbers are previously given to the respective divided areas from the upper left in the horizontal direction sequentially, and the number is applied as the position coordinate.

The link destination indicates link information associated with the annotation. In the document processing system 90 of this embodiment, the link information is given by a path such as a URL or a path to a directory, as shown in the figure as an example.

The user can set a link destination for each annotation to be attached. The link destination can be set each time the annotation is attached or the storage instruction of the annotation is issued.

In the document processing system 90 of this embodiment, the label annotation in which a link is provided is displayed in the state where the information of the link destination is displayed in the inside. For example, in the example shown in FIG. 2, "content review", "meaning obscure" or "deletion" is displayed as the information of the link destination in the label annotation 86.

On the other hand, the open attribute takes one of attributes that the annotation can be made open to the public (without limitation) (=Pub), it is made open to specific other users or only in a group (=Frd), it is made not open (personal) (Priv), and it is allowed to be made open only in a case where authentication is obtained (=Protect).

With respect to the specific open (=Frd) and the authentication open (=Protect), sub-attributes such as a user, a group and an authentication code (user name and password) can be set. Besides, in the case of the specific open and the authentication open, a sub-attribute of full access can be set in which limitations are not put on the open of only the display (read-only), and an edit by another person is also allowed. Incidentally, it is needless to say that the common inspection of documents and annotations is generally made open to the public as read-only. This is for preventing the occurrence of disadvantage caused by permitting anyone to freely edit. However, according to a user, there is a case where it is more advantageous to cause an edit to be freely performed. In such a case, the full access setting is performed.

The user can set the open attribute for each annotation to be attached. The open attribute can be set each time the annotation is attached or the storage instruction of the annotation is issued. Besides, one of the attributes is set as a default, and in the case where there is no change instruction, the attribute of the default may be set. Besides, in the case where there is no change instruction of the open attribute at the time of the storage of the annotation, the attribute set at the time point is received.

When the open is allowed only in the case where the authentication is obtained (=Protect), the open is allowed only when the password authentication is obtained by a predetermined procedure. When the annotation is displayed, all annotations including an annotation of a private object are transmitted from the annotation management server 20 to the client system 94, the open attributes set for the annotations are checked at the side of the client system 94, and the display (open to the public)/non-display (private) is switched, or only annotations of open objects are transmitted from the annotation management server 20.

The status indicates one of states in which the annotation is newly prepared (=New), it has already existed (=Exist), and it was deleted (=Deleted). When an annotation once attached is erased by the user using an electronic eraser or the like, the status becomes "Deleted". In this case, data of the annotation erased from the label annotation database DB2 by this delete instruction does not disappear, and only the status is changed. That is, in the case where there occurs a new attachment time of an annotation, a change in the attribute and position, or the like, a creation time of the annotation before the change, a creation time of the annotation after the change, and an erasure time (not shown) of the erased annotation are registered and managed as access history of the annotation in the label annotation database DB2 for each annotation.

Here, when the annotation is displayed, all annotations including the annotation of "deleted" are transmitted from the annotation management server 20 to the client system 94, the statuses set for the annotations are checked at the side of the client system 94, and the display/non-display is switched, or only the annotations of "Exist" are transmitted to the client system 94 from the side of the annotation management server 20.

The creation time is the time when the annotation of one label is attached in the client device 50 (drawn in the display area 53A). This is managed for each annotation of one label by the server differently from the time when it is stored in the client device 50 by designating the storage button 74.

Further, the edit information includes two pieces of information of reference check information and the foregoing modification relevant information.

As the reference check information of this embodiment, as shown in FIG. 4 as an example, when the modification relevant information is given from the client device 50, information (herein "C") indicating that reference is made to the comment indicated by the corresponding label annotation at the time of document modification is registered.

The document editing AP of this embodiment is constructed such that when an edit operation is performed to an electronic document, information indicating a modified place and information indicating modification contents are stored in a predetermined area of the main storage part 52. In the client device 50, when the edit operation is performed while referring to the comment displayed by the label annotation, these pieces of information are associated with information (in this embodiment, annotation ID) indicating the label annotation and are stored in the main storage part 52, and these pieces of information are given to the annotation management server 20 at a predetermined timing (in this embodiment, the timing when the storage button 74 is designated). In response thereto, on the basis of the given information, the annotation management server 20 registers, as the modification relevant information, the information indicating the modified place and the information indicating the modification contents into the label annotation database DB2. Here, whether the edit operation is performed while referring to the comment displayed by the label annotation, can be judged by judging whether the reference check mark 87 is checked by the user.

The modification relevant information of this embodiment is displayed in a following format as shown in FIG. 4 as an example.

For example, the modification relevant information of the label annotation in which the annotation ID shown in FIG. 4 is "0001" indicates that "outline" as seven characters from the first character of the fifth line of page 1 on the document with the document ID of "0002" is modified to "OUTLINE". Incidentally, the various pieces of information of the page, the modification start line, the modification start character, and the number of the modification characters in the modification relevant information correspond to the modified place information of the invention, and various information of the character string before modification, and the character string after modification correspond to the modification content information of the invention.

When the annotation already attached is moved, or when the open attribute is changed, the original annotation is regarded as being deleted, the status is changed to "Deleted", and a new annotation ID is issued. When the annotation once attached is deleted or modified, all annotations including the annotation of "Deleted" are transmitted from the annotation management server 20 to the client system 94, the status is checked at the side of the client system 94, and the annotation with the status of "Deleted" can also be reproduced in the original state by switching display/non-display.

The description has been given to the case where the annotation as the storage object is the label annotation. On the other hand, when the annotation as the storage object is a handwritten input annotation, the registration processing of the annotation is performed in the annotation management server 20 as described below.

First, contents, position information of the annotation, its color, its shape, a document ID of a document to which the annotation is attached, and a terminal ID of the client device 50 instructing the annotation are given to the annotation management server 20 from the client device 50. At this time, a user name (or user ID) of a user having attached the annotation to storage, an open attribute relating to the annotation, a status indicating a state (new, existing, deletion) of the annotation, and a time when the annotation is attached are also given from the client device 50.

The annotation management server 20 stores the annotation ID, the terminal ID, the user ID (or user name), the document ID, the position information, the annotation contents, the color, the shape, the open attribute, the status, and the creation time into the pen input annotation database DB3 in a table form. At this time, the data structure in the pen input annotation database DB3 is as shown in FIG. 5 as an example.

In the figure, the annotation ID, the terminal ID, the user ID, the document ID, the position information, the open attribute, the status, and the creation time are similar to those of the label annotation database DB2. However, although the annotation ID is assigned to each label when it is registered in the label annotation database DB2, the annotation ID is assigned to each stroke in the pen input annotation database DB3, which is the only difference.

On the other hand, the annotation contents in the figure are locus information of the annotation of one stroke, and are data used for reproducing the drawn annotation, and are, for example, data such as bitmap or vector data. The color shape is the color of ink used for the annotation and the shape information such as a circle or a square. Further, the kind of a line indicates the kind of a line, such as the thickness of the annotation, a solid line or a dotted line.

In a state where a document is displayed in the document display area 53C of the display part 53, when it is detected that the retrieval button 76 is designated, the client device 50 notifies the annotation management server 20 of information to that effect. In response thereto, the annotation management server 20 reads out the information relating to the annotation, whose retrieval is instructed, from the label annotation database DB2 and the pen input annotation database DB3.

That is, the annotation management server 20 receives the instruction of "retrieval" from the client device 50. At this time, the annotation management server 20 receives the document ID and the information relating to the annotation attachment range from the client device 50. The annotation management server 20 searches the label annotation database DB2 and the pen input annotation database DB3 on the basis of these pieces of information (retrieval conditions), reads out information relating to the annotation which can become a display object, and transmits it to the client device 50 as the access origin.

In response thereto, in the client device 50, the annotation indicated by the information received from the annotation management server 20 is overlapped with the document under inspection and is displayed. FIG. 2 shows an example of a state in which the label annotation 86 and the handwritten input annotation 88 are overlapped with the document 84 by the above processing and are displayed.

Next, the message shared server 30 of this embodiment functions as the bulletin board system for the users of the document processing system 90.

That is, when a message is written from one of the client devices 50 in the document processing system 90, the message shared server 30 registers information relating to the message into a message database DB4.

In the bulletin board system, in general, a first message, together with a title, is written by a user, a message relating to the former message is written by another user who refers to that, and further, a message relating to this message is written by another user or the user who first wrote the message, and such an operation is suitably performed. At this time, a title corresponding to the title provided in the first message is provided in the message other than the first message, so that the parent-child relation of the respective messages can be grasped by referring to the titles or by embedding the ID of the parent message into the reply message when the reply is created.

In the message shared server 30, messages written on the bulletin board system from respective users, together with titles corresponding to the messages, are sequentially registered in the message database DB4. At this time, the data structure in the message database DB4 is as shown in FIG. 6 as an example.

In the figure, a message ID is for managing respective messages, and a unique ID number is assigned to each message. Here, there are a system in which the message ID is issued at the side of the client system 94 and a system in which it is issued at the side of the message shared server 30.

Besides, an update time is a time when a message is written on the bulletin board system. The update time is registered using date information measured by a not-shown timer provided in the control part 31 of the message shared server 30. However, the invention is not limited to this, and a mode may be adopted in which information indicating the writing time of the message is given from the client device 50 as the message writing origin, and this is registered.

An immediately preceding message ID is information indicating a message ID assigned to a message corresponding to the parent of a corresponding message, and an immediately following message ID is information indicating a message ID assigned to a child message of the corresponding message. In the document processing system 90 of this embodiment, as the immediately preceding message ID in the case where the corresponding message is the first message and there is no parent message, and as the immediately following message ID in the case where the corresponding message is the final message to a common title and there is no child message, information ("0" in this embodiment) which can not be taken as the message ID is registered.

In the example shown in the figure, since each of the messages in which message IDs are "1517", "1518" and "1519" has the immediately preceding message ID of "0", it is understood that they are the first messages. In the message with the message ID of "1519", since both the immediately preceding message ID and the immediately following message ID are "0", it is understood that the message is the first message and the single message having no child message. Further, in the message with the message ID of "1520", since the immediately preceding message ID is "1517" and the immediately following message ID is "0", it is understood that the message is the child message of the message with the message ID of "1517" and is the message having no child message.

A title is information indicating a title provided for a corresponding message, and a message is information indicating a message main body.

When the display of the bulletin board system is instructed from one of the client devices 50, the message shared server 30 reads out the information relating to the respective messages from the message database DB4, creates information capable of displaying the titles of the respective messages in a list so that the parent-child relation can be recognized, and transmits it to the client device 50 as the access origin. In response thereto, the client device 50 uses the received information to display the titles of the respective messages in a list. Thus, the user of the client device 50 designate a desired title by pointing it with the annotation device 56, or the keyboard or mouse of the operation part 54 to display the message corresponding to the title, or writes a message to the displayed message.

Incidentally, since the use mode of the bulletin board system is well known, a further description will be omitted here.

Figure 7:
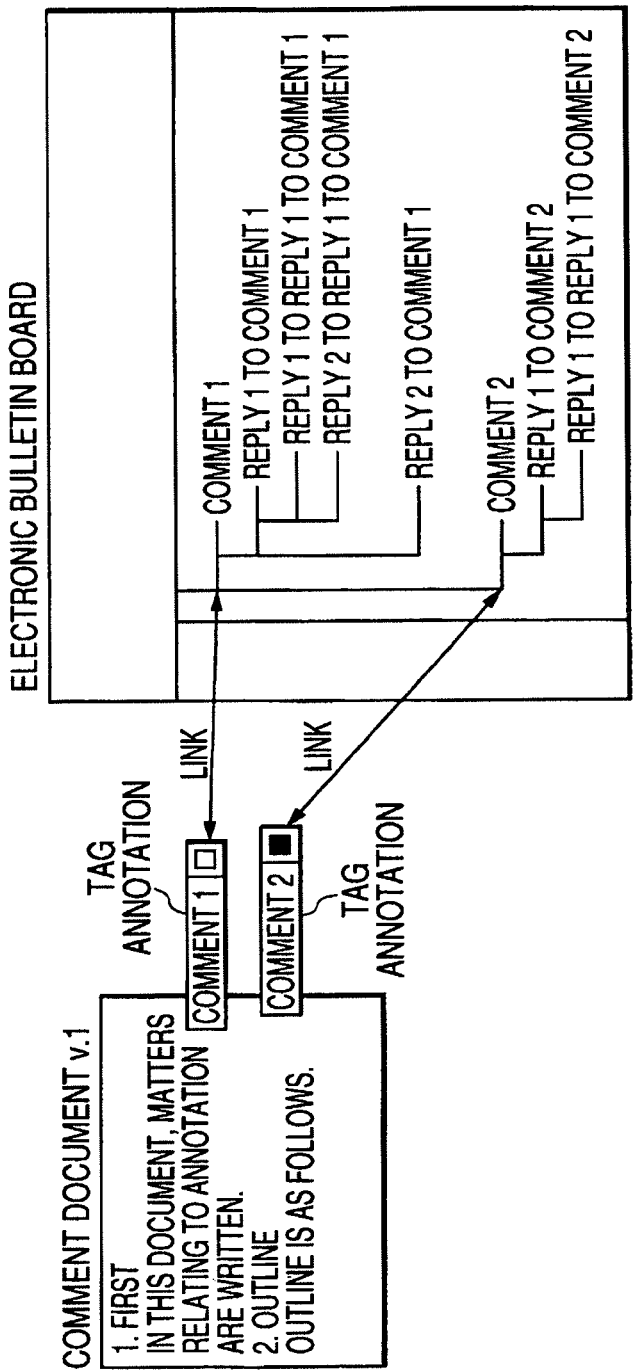
FIG. 7 is a schematic diagram showing a state in which a label annotation according to an embodiment is associated with link information to provide a link to a message (comment) posted on an bulletin board system based on a message shared server.

In the document processing system 90 of this embodiment, as schematically shown in FIG. 7 as an example, a label annotation attached to an electronic document can be associated with link information to provide a link to a message (comment) posted on the bulletin board system of the message shared server 30.

In the document processing system 90, with respect to the label annotation in which the link to the message written on the bulletin board system is provided, in the case where the message of the link destination is information relating to a modification of a part of contents of the electronic document to which the label annotation is attached, and in the case where the part of the contents of the electronic document is modified in light of the message by using the document editing AP, information indicating the modified place and information indicating the modification contents are associated with the message and are stored. As a result, the modification reason specifying function is provided which can specify the reason of the modification according to the instruction input of the user. At this time, a person attaching the label annotation attaches the label annotation to a position corresponding to the modified place (for example, a position overlapping with the modified place, a position in the vicinity of the modified place and not overlapping with the modified place, a position in the vicinity of the modified place and in the vicinity of a peripheral part of the document and not overlapping with the contents of the document, or the like). The modified place can be specified by the attachment position of the label annotation, and the advantageousness can be improved.

Figure 8:
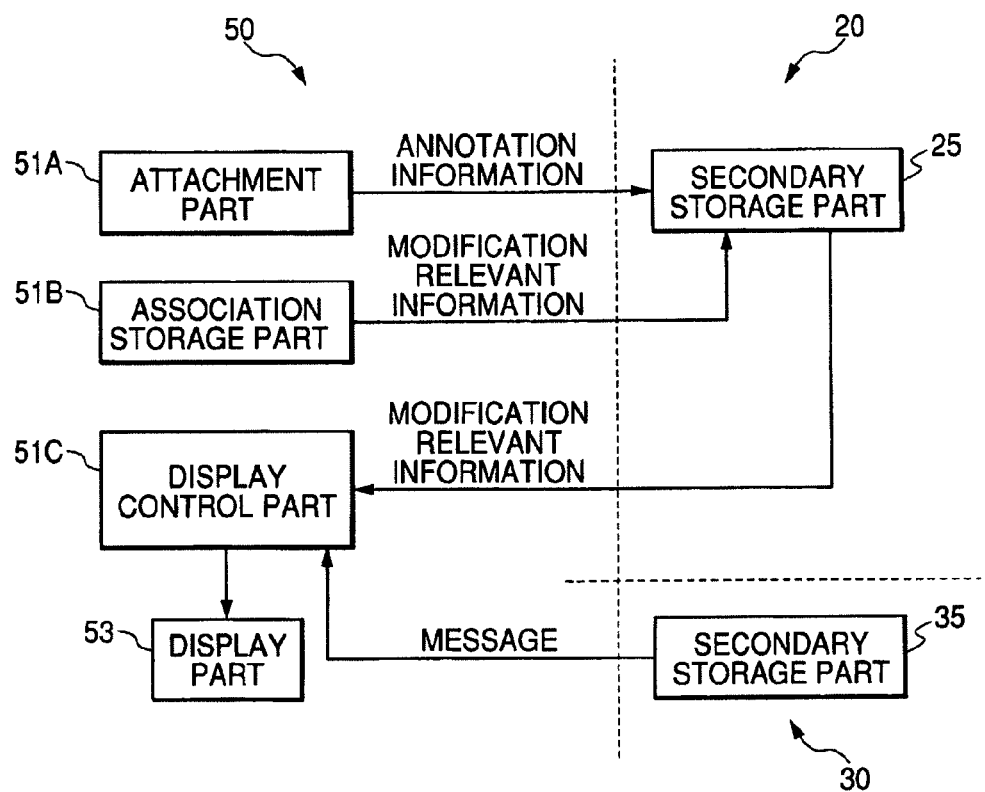
FIG. 8 is a block diagram showing a functional structure of a document processing system to realize a modification reason specifying function according to an embodiment.

FIG. 8 is a block diagram showing a functional structure of the document processing system 90 to realize the modification reason specifying function.

As shown in the figure, in order to realize the modification reason specifying function, each of the client devices 50 includes an attachment part 51A, an association storage part 51B and a display control part 51C.

In order to produce a state in which a comment relating to a modification of a part of contents of a document is attached to the document by a label annotation, the attachment part 51A of this embodiment registers the information relating to the label annotation attached by the user into the label annotation database DB2 of the secondary storage part 25 of the annotation management server 20 at a predetermined timing. In this embodiment, as the predetermined timing, the timing when the instruction input is performed by the user (in this embodiment, the designation of the storage button 74) is applied. However, the invention is not limited to this, and for example, a timing at intervals of a predetermined period (for example, every second) in a state where a label annotation is displayed, a timing when display contents in the display part 53 are updated, or the like can also be applied.

When the part of the contents of the document is modified in light of the message of the link destination indicated by the link information associated with the label annotation, the association storage part 51B of this embodiment registers the information indicating the modified place and the information indicating the modification contents (in this embodiment, modification relevant information) at a predetermined timing into the label annotation database DB2 of the secondary storage part 25 of the annotation management server 20. In this embodiment, as the predetermined timing, the timing when the instruction input is performed by the user (in this embodiment, the designation of the storage button 74) is applied. However, the invention is not limited to this, and for example, a timing at intervals of a predetermined period (for example, every second) in a state where the label annotation is displayed, a timing when display contents in the display part 53 are updated, or the like can also be applied.

On the other hand, the display control part 51C of this embodiment refers to the modification relevant information registered in the label annotation database DB2 by the association storage part 51B when the document is displayed by the display part 53, and controls the display part 53 so that the modified place of the document is displayed to be distinguishable. Incidentally, in this embodiment, the underline is added to the modified place to make the modified place distinguishable. However, the invention is not limited to this, but can adopt any mode in which the display state is made different between the modified place and another place, such as, for example, a mode in which the modified place is displayed in a color different from another place, a mode in which a mark other than the underline is displayed at the modified place, or a mode in which the modified place is brink-displayed or reverse-displayed.

Besides, when a document in which a modification corresponding to a message based on a label annotation is added is displayed by the display part 53, the display control part 51C refers to the modification relevant information registered in the label annotation database DB2 at a predetermined timing, and controls the display part 53 so that the contents of the modification added to the document are displayed. In this embodiment, as the predetermined timing, the timing when the user designates the modified place by pointing it with the annotation device 56, or the keyboard or mouse of the operation part 54 is applied. However, the invention is not limited to this, and for example, a button to instruct a display of the modification contents is provided in the button display area 53B of the display part 53, and a timing when the button is designated by the user can also be applied.

Further, when the document in which the modification corresponding to the message based on the label annotation is added is displayed by the display part 53, the display control part 51C controls the display part 53 so that messages relating to the above message (in this embodiment, messages (group) exchanged on the bulletin board system while the message displayed in the label annotation is the starting point thereof) are displayed at a predetermined timing. Incidentally, in this embodiment, as the predetermined timing, the timing when the user designates the modified place by pointing it with the annotation device 56, or the keyboard or mouse of the operation part 54 is applied. However, the invention is not limited to this, and for example, a button to instruct the display of messages relating to the message is provided in the button display area 53B of the display part 53, and a timing when the button is designated by the user can also be applied.

In the document processing system 90 of this embodiment, the modification reason specifying function is realized by execution of software.

Next, the operation of the client device 50 to realize the modification reason specifying function will be described in detail.

Figure 9:
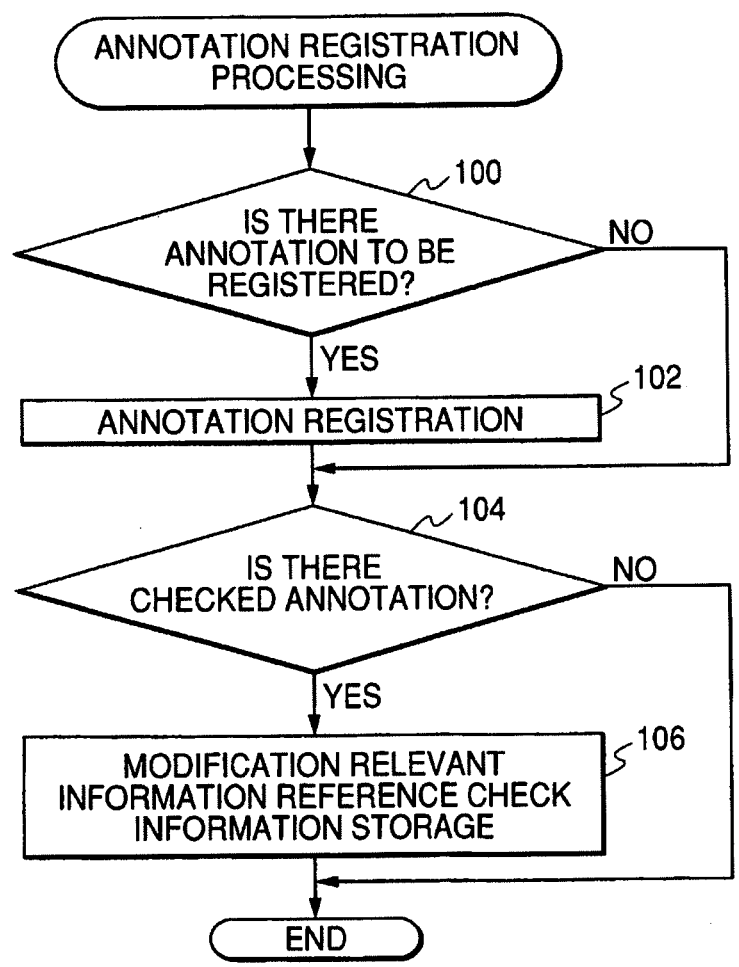
FIG. 9 is a flowchart showing a flow of processing of an annotation registration processing program according to an embodiment.

First, the operation of the client device 50 at the time when information relating to a label annotation is registered will be described with reference to FIG. 9. FIG. 9 is a flowchart showing the flow of processing of an annotation registration processing program executed by the control part 51 of the client device 50 when the storage button 74 is designated by the user in a state where a document and an annotation are displayed in the display part 53 of the client device 50, and the program is previously stored in a predetermined area of the main storage part 52.

First, at step 100 of the figure, it is judged whether there is an annotation to be newly registered in the annotation management server 20 by judging whether there is an annotation newly attached by the user. When the judgment is affirmative, the procedure proceeds to step 102, information relating to all annotations to be newly registered is transmitted to the annotation management server 20, and then, the procedure proceeds to step 104. When receiving the information relating to the annotation, the annotation management server 20 registers the information relating to the label annotation into the label annotation database DB2, and registers the information relating to the handwritten input annotation into the pen input annotation database DB3.

When the judgment is negative at the step 100, the processing of the step 102 is not executed and the procedure proceeds to the step 104.

At the step 104, it is judged whether there is a label annotation (hereinafter referred to as a "processing object annotation") put in a state indicating that the corresponding reference check mark 87 has been checked, and in the case where the judgment is affirmative, the procedure proceeds to step 106.

At the step 106, with respect to all processing object annotations, information indicating the modified place stored when the edit operation to the document is performed by the document editing AP, information indicating the modification contents, and information (in this embodiment, annotation ID) indicating the label annotation are read out from the main storage part 52 and are transmitted to the annotation management server 20, and then, the annotation registration processing program is ended. When these pieces of information are received, with respect to all processing object annotations, the annotation management server 20 registers (stores) the received information indicating the modified place and the information indicating the modification contents, as the modification relevant information corresponding to the information indicating the received label annotation, into the label annotation database DB2. At this time, in the annotation management server 20, with respect to all processing object annotations, reference check information corresponding to the information indicating the received label annotation is made information (here, "C") indicating that the message indicated by the label annotation has been referenced at the modification of the document.

When the judgment is negative at the step 104, the processing of the step 106 is not executed, and the annotation registration processing program is ended.

Figure 10:
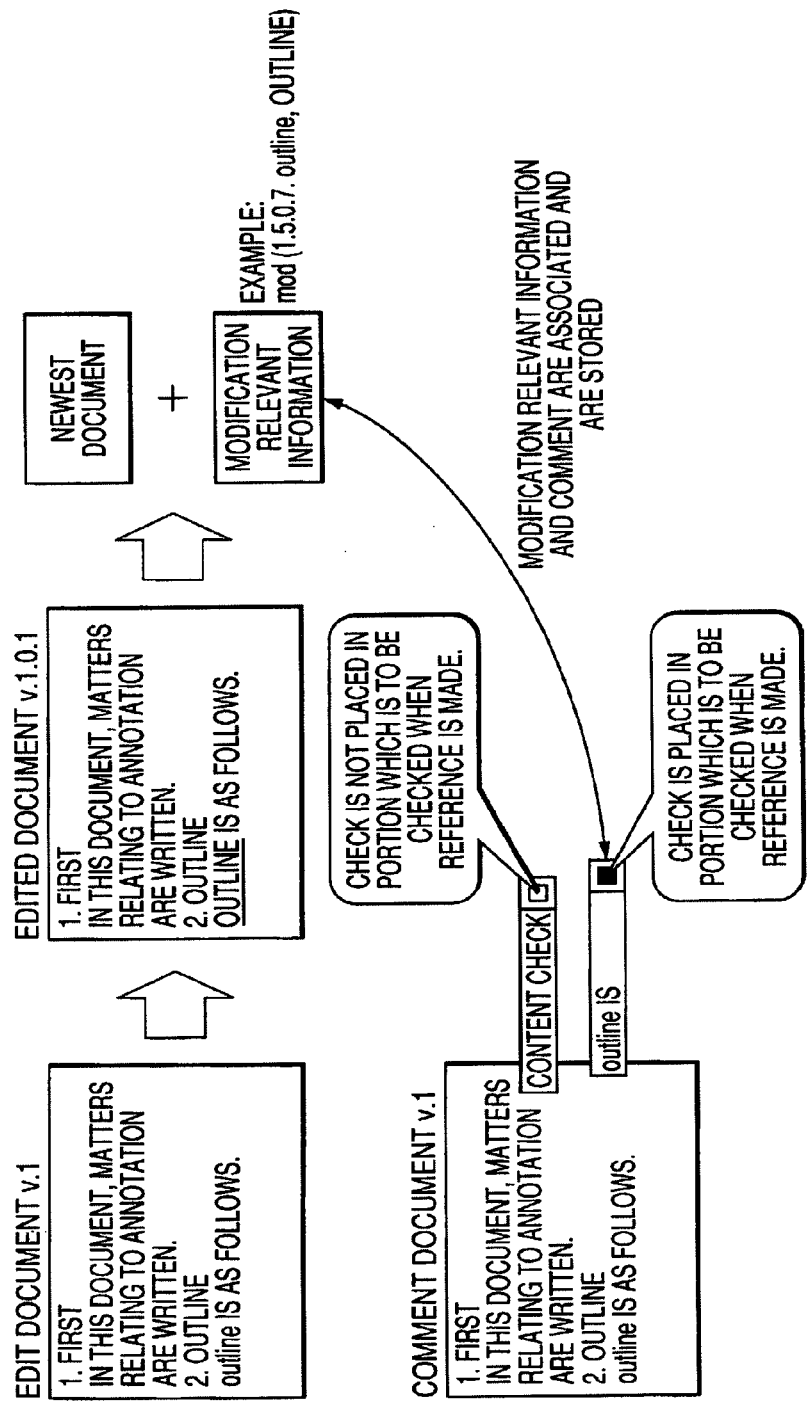
FIG. 10 is a schematic view showing the whole processing flow when an edit operation of a document is performed while referring to a message displayed by a label annotation in a document processing system according to an embodiment.

FIG. 10 schematically shows the flow of whole processing when the edit operation of the document is performed while referring to the message displayed by the label annotation.

As shown in the figure, the user first causes the document editing AP to be executed so that a document (edit document v.1) to be edited is displayed on the document edit screen, and a document (comment document v.1) created by copying the document, together with the attached label annotation, is displayed in the document display area 53C.

Next, the user refers to the comment (message on the bulletin board system as the link destination of the label annotation) displayed in the label annotation attached to the comment document, and in the case where the message relates to the modification of part of the contents of the document, the user refers to the message, and edits the document (in the figure, "outline" is modified to "OUTLINE"), and checks the reference check mark 87 corresponding to the label annotation (processing object annotation) in which the reference message is displayed.

In response thereto, in the client device 50, by the document editing AP, the information indicating the modified place stored in the main storage part 52 and the information indicating the modification contents are associated with the information (in this embodiment, the annotation ID) indicating the processing object annotation and are stored in the main storage part 52. These pieces of information are given (corresponding to the processing of the step 106 of the annotation registration program) to the annotation management server 20 at a predetermined timing (in this embodiment, the timing when the storage button 74 is designated). On the bases of the given information, the annotation management server 20 registers the information indicating the modified place and the information indicating the modification contents, as the modification relevant information and in the state where they are associated with the comment indicated by the processing object annotation, into the label annotation database DB2.

Figure 11:
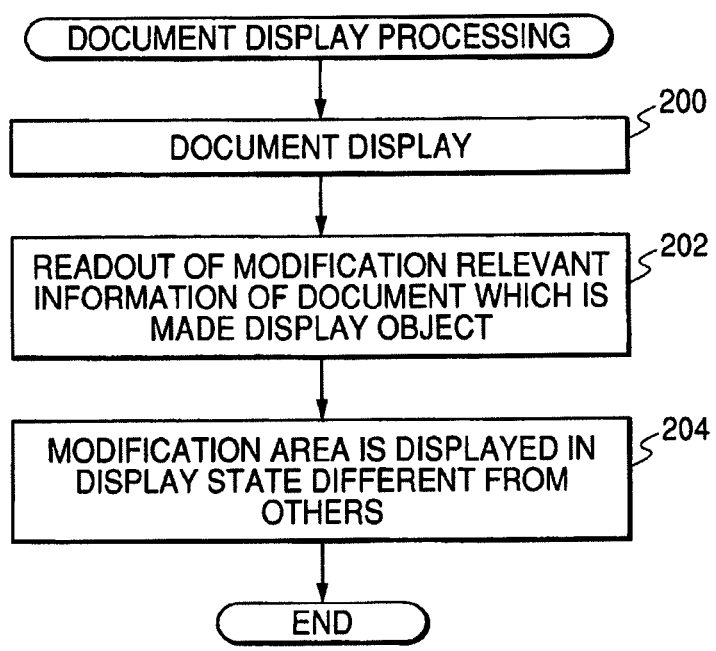
FIG. 11 is a flowchart showing a flow of processing of a document display processing program according to an embodiment.

Next, the operation of the client device 50 at the time when the document as the edit object of the document editing AP is displayed on the display part 53 will be described with reference to FIG. 11. FIG. 11 is a flowchart showing the flow of processing of a document display processing program executed by the control part 51 of the client device 50 when the document as the edit object designated by the user is displayed on the display part 53, and the program is previously stored in a predetermined area of the main storage part 52.

First, at step 200 of the figure, a document main body of a document as an edit object designated by the user is read out from the document database DB1 through the document management server 10, and the display part 53 is controlled so that the document main body is displayed. By this, the main body of the document as the edit object designated by the user is displayed on the document edit screen by the document editing AP of the display part 53.

At next step 202, the modification relevant information corresponding to the document as the edit object is read out from the label annotation database DB2 through the annotation management server 20, and at next step 204, the display part 53 is controlled so that the modified place indicated by the read modification relevant information is brought into a distinguishable state (in this embodiment, an underline is added to the modified place), and then, the document display processing program is ended.

According to the document display processing program, as shown in the edit document v.1.0.1 of FIG. 10 as an example, the modified place is brought into the distinguishable state, and the user can easily grasp the modified place.

Figure 12:
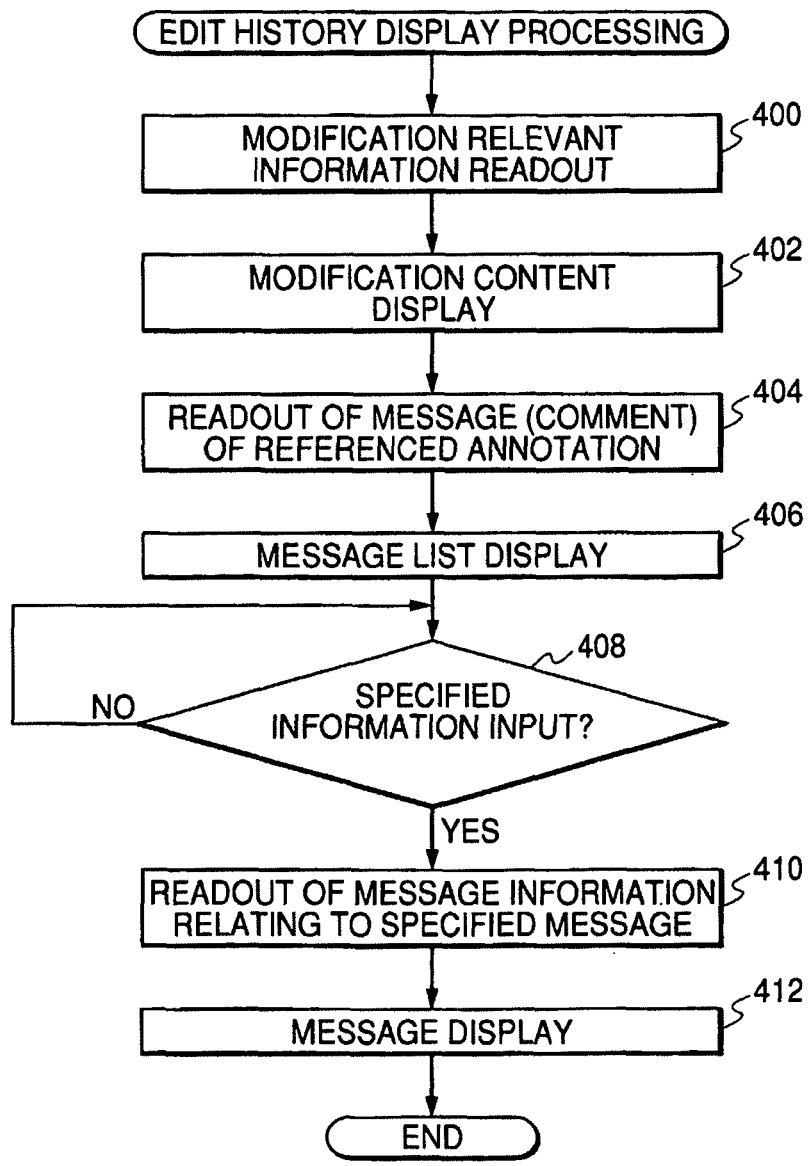
FIG. 12 is a flowchart showing a flow of processing of an edit history display processing program according to an embodiment.
Figure 13:
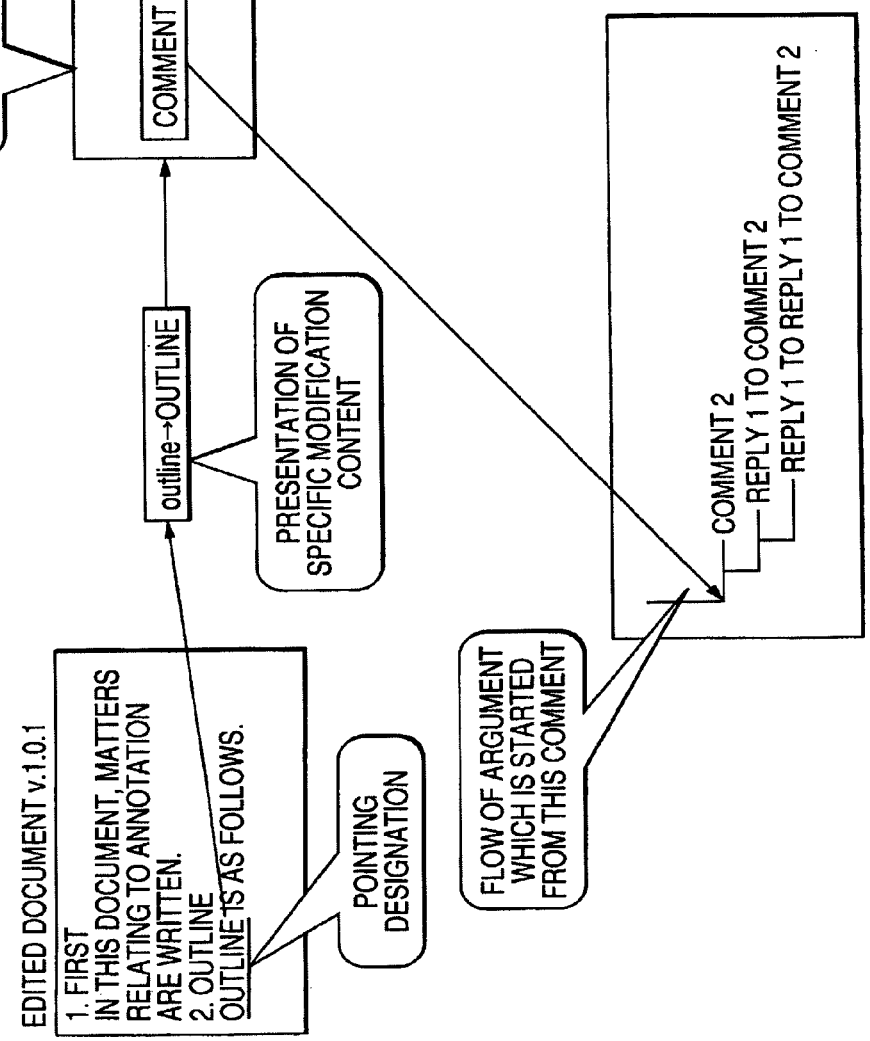
FIG. 13 is a schematic view showing a display screen at a time of execution of the edit history display processing program according to the embodiment.

Next, with reference to FIG. 12, a description will be given to the operation of the client device 50 at the time when the contents of the modification added by using the document editing AP to the document displayed on the display part 53 and the message (message displayed by the label annotation) referenced at the time of the modification are displayed. FIG. 12 is a flowchart showing the flow of an edit history display processing program executed by the control part 51 of the client device 50 when, as shown in FIG. 13 as an example, a document (in FIG. 13, an edit document v.1.0.1) added with a modification corresponding to a message based on a label annotation is displayed on the display part 53 in such a manner that a modified place is distinguishable, and when the modified place is designated by the user by pointing it with the annotation device 56 or the keyboard or mouse of the operation part 54. The program is previously stored in a predetermined area of the main storage part 52.

First, at step 400 of the figure, the modification relevant information corresponding to the modified place (hereinafter referred to as "processing object modified place") designated by the user is read out from the label annotation database DB2 through the annotation management server 20. Incidentally, the readout of the modification relevant information can be performed by reading out the modification relevant information which corresponds to the document being displayed and in which the position designated by the user is included in the area indicated by the information indicating the modified place.

At next step 402, the display part 53 is controlled so that the modification contents indicated by the read modification relevant information is displayed. By this, as shown in FIG. 13 as an example, an image (in the example shown in the figure, the image indicating that "outline" is modified to "OUT-LINE") indicating the modification contents of the processing object modified place is displayed on the display part 53.

At next step 404, all messages (starting point messages on the bulletin board system) displayed in the label annotation, which are referenced at the modification of the processing object modified place, are read out from the message database DB4 through the message shared server 30, and at next step 406, the display part 53 is controlled so that the read messages are displayed in a list form. As shown in FIG. 13, the starting point messages (group) relating to the modification are displayed on the display part 53. The readout of the message at the step 404 can be performed in such a manner that all link information corresponding to the document being displayed and corresponding to the modification relevant information in which the position designated by the user is included in the area indicated by the information indicating the modified place is read out from the label annotation database DB2, and then, the messages corresponding to all message IDs corresponding to the read link information are read out from the message database DB4.

When the starting point messages (group) are listed in the display part 53 by the above processing, the user designates one of the displayed starting point messages (group), in which more detailed messages (in this embodiment, messages exchanged from the listed message as the starting point) are desired to be displayed, by pointing with the annotation device 56, or the keyboard or mouse of the operation part 54.

At next step 408, designation waiting by the user of the starting point message is performed, and at next step 410, all messages exchanged from the message designated by the user as the starting point are read out from the message database DB4, and at next step 412, the display part 53 is controlled so that the read messages are displayed, and then, the edit history display processing program is ended.

By the processing of the step 412, as shown in FIG. 13 as an example, the flow of the messages referenced at the modification of the processing object modified place is displayed on the display part 53.

As described above in detail, according to this embodiment, the comment relating to the modification of the part of the contents of the electronic document is attached as the additional information to the electronic document as the processing object, and in the case where the part of the contents in the electronic document is modified in light of the comment, the modified place information (part of the modification relevant information) indicating the modified place is associated with the comment and is stored. Thus, even in the case where there are plural modified places in the electronic document, the reason for modification of each of the modified places can be easily grasped only by referring to the comment associated with the modified place and stored.

Besides, in this embodiment, since the display unit (display part 53) is controlled to display the electronic document so that the modified place can be distinguished, the user can easily grasp the modified place.

Besides, in this embodiment, the modification content information (part of the modification relevant information) indicating the modification contents to the modified place of the electronic document is associated with the corresponding comment and is further stored, and the display unit is controlled so that the modification contents indicated by the modification content information are further displayed, and therefore, the user can easily grasp the modification contents.

Besides, in this embodiment, since the display unit is controlled to further display the relevant information relating to the comment, the user can easily grasp the relevant information.

Especially, in this embodiment, since the relevant information is made the messages exchanged on the bulletin board system in relation to the modification of the part of the contents of the electronic document, the user can easily grasp the history of discussion for the modification to the modified place.

Further, in this embodiment, since the additional information is attached to the position corresponding to the modified place, the modified place on the document can be specified by the attachment position of the additional information, and the advantageousness can be raised.

In the above, although the invention has been described by the use of the embodiment, the technical scope of the invention is not limited to the above embodiment. Various modifications or improvements can be added to the above embodiment within the scope not departing from the gist of the invention, and modes in which such modifications or improvements are added are also contained in the technical scope of the invention.

Besides, the above embodiment is not limit the invention as recited in claims, and all of combinations of features described in the embodiment are not necessarily indispensable for resolution of the invention. The foregoing embodiment includes various stages of inventions, and various inventions can be extracted by suitable combinations of the plural disclosed structural elements. Even if some structural elements are deleted from all structural elements described in the embodiment, as long as the effect is obtained, the structure in which the some structural elements are deleted can be extracted as the invention.

For example, in the above embodiment, the description has been given to the case where the modification relevant information is registered when the reference check mark 87 is checked. However, the invention is not limited to this, but can adopt, for example, a mode in which a dedicated button to be designated when the modification relevant information is registered is displayed in the button display area 53B of the display part 53, and the modification relevant information is registered when the button is designated by the user. Also in this case, the effect similar to the above embodiment can be obtained.

Besides, in the above embodiment, the description has been given to the case where the message (starting point message on the bulletin board system) of the link destination is displayed in the label annotation. However, the invention is not limited to this, but can adopt, for example, a mode in which the user inputs a comment relating to a modification of a part of contents of a document to a label annotation, and the comment is displayed. In this case, a mode can be adopted in which the label annotation is associated with link information to provide a link to a starting point message of messages exchanged on the bulletin board system in relation to the comment. Also in this case, the effect similar to the above embodiment can be obtained.

Besides, in the above embodiment, the description has been given to the case where, when the modified place of the document is designated by the user, the modification contents and the message referenced when the modification is performed are displayed on the basis of the modification relevant information. However, the invention is not limited to this, but can adopt, for example, a mode in which the modified place is associated with link information to provide a link to the information indicating the modification contents and a link to the message referenced, and the modification contents and the message are displayed on the basis of the link information. Also in this case, the effect similar to the above embodiment can be obtained.

Besides, in the above embodiment, the description has been given to the case where the label annotation is associated with the link information to provide a link to the starting point message exchanged on the bulletin board system. However, the invention is not limited to this, but can adopt, for example, a mode in which instead of the link information, the label annotation is associated with link information to provide a link to a modified place on a document in which modification is performed while referring to the message (comment) displayed in the label annotation. In this case, the modified place corresponding to the label annotation can be displayed only by designating the label annotation by pointing, and the advantageousness can be raised.

Besides, in the above embodiment, the description has been given to the case where the label annotation is associated with the link information to provide a link to the starting point message exchanged on the bulletin board system. However, the invention is not limited to this, but can adopt, for example, a mode in which instead of the starting point message, the label annotation is associated with link information to provide a link to other messages exchanged while the starting point message is made the starting point. In this case, the most important message relating to the modification of the document, the newest message and the like can be displayed in the label annotation, and the advantageousness can be raised.

Besides, in the above embodiment, the description has been given to the case where the handwritten input by the annotation device 56 is realized by the touch panel system. However, the invention is not limited to this, but can adopt, for example, a mode in which the handwritten input is realized by a detection mechanism of an electromagnetic induction system. Also in this case, the effect similar to the embodiment can be obtained.

Besides, in the above embodiment, the description has been given to the case where the handwritten input is realized by using the pen-type annotation device 56. However, the invention is not limited to this, but can adopt, for example, a mode in which the handwritten input is realized by using an input/instruction device such as a keyboard or a mouse. In this case, since it becomes unnecessary to use the tablet PC as the client device 50, the document processing system 90 can be configured at low cost.

Besides, in the above embodiment, the description has been given to the case where the invention is applied to the client/server system. However, the invention is not limited to this, but can adopt, for example, a mode in which the invention is applied to a P2P (Peer to Peer) system, or a mode in which the invention is applied to a single (stand-alone) information processing apparatus. Here, in the case where the invention is applied to the P2P system, the processings of the respective servers in the server system 92 described in the above embodiment are made executable in the respective client devices. Also in the case where the invention is applied to the single information processing apparatus, the processings of the respective servers described in the embodiment are made executable in the information processing apparatus. However, in this case, the processing and the structure for performing the transmission/reception of information between the respective devices become unnecessary. Also in these cases, the effect similar to the above embodiment can be obtained.

Besides, in the above embodiment, the description has been given to the case where the document management server 10, the annotation management server 20, and the message shared server 30 are configured as separate bodies. However, the invention is not limited to this, but can adopt, for example, a mode in which the functions of the respective servers are realized by a single (stand-alone) information processing apparatus such as a PC or a workstation. Also in this case, the effect similar to the above embodiment can be obtained.

Besides, in the embodiment, the description has been given to the case where the modification reason specifying function is realized by software. However, the invention is not limited to this, but can adopt, for example, a mode in which the function is realized by hardware. As a mode example of this case, a mode can be exemplified in which a functional device operating similarly to the attachment part 51A, the association storage part 51B, and the display control part 51C shown in FIG. 8 is provided in the client device 50. In this case, as compared with the above embodiment, the speedup of the modification reason specifying function can be expected.

Besides, the data structures (see FIGS. 3 to 6) of the respective databases shown in the above embodiment are also examples, and naturally, an item for storage can be added as the need arises, and an unnecessary item can be deleted, and further, it is needless to say that the storage contents of respective items can be suitably modified. For example, in the label annotation database DB2 shown in FIG. 4, the information of "open attribute" and "status" are not always necessary, but can be deleted.

Besides, the flows (see FIGS. 9, 11 and 12) of the processing of the various processing programs shown in the above embodiment are also examples, and can be naturally modified within the scope not departing from the gist of the invention.

Further, when the system is configured, the distribution of the respective functional elements between the server system 92 and the client system 94 is not limited to that described in the above embodiment, and it is needless to say that advantageous distribution in configuration of the system may be performed.

As described above, some embodiments of the invention are outlined below.

According to an embodiment of the present invention, a document processing apparatus includes an attachment unit that attaches, as additional information, a comment relating to a modification of a part of contents of an electronic document to the electronic document as a processing object, and a storage unit that associates, in a case where the part of the contents of the electronic document is modified in light of the comment, modified place information indicating a modified place with the comment and stores them.

According to the document processing apparatus of the embodiment, the comment relating to the modification of the part of the contents of the electronic document is attached, as the additional information, by the attachment unit to the electronic document as the processing object. Incidentally, the additional information includes character information, image information and sound information.

Here, in the case where the part of the contents of the electronic document is modified in light of the comment, the modified place information indicating the modified place and the comment are associated with each other and are stored by the storage unit. Incidentally, the storage unit includes a semiconductor storage element such as a RAM (Random Access Memory), an EEPROM (Electrically Erasable and Programmable Read Only Memory), and a flash EEPROM (Flash EEPROM), a movable storage medium such as a SmartMedia (registered trade mark), an xD-Picture Card, a CompactFlash (CompactFlash), an ATA (AT Attachment) card, a microdrive, a floppy disk, a CD-R (Compact Disc-Recordable), a CD-RW (Compact Disc-ReWritable), and a magneto-optical disk, a fixed storage medium such as a hard disk, and an external storage device provided in a server computer or the like connected to a network. The document processing apparatus may further include a display unit that displays the electronic document, and a display control unit that controls the display unit to display the electronic document and to make the modified place distinguishable. Here, the display unit includes a display device having a display, such as a liquid crystal display, a plasma display, an organic EL display, and a CRT display. Besides, a display mode making the modified place distinguishable includes a mode in which the modified place is displayed in a color different from another place, a mode in which a mark such as an underline is displayed in the modified place, a mode in which the modified place is blink-displayed or reverse-displayed, and a mode in which a display state is made different between the modified place and another place.

Further, in the document processing apparatus, the storage unit may associate modification content information indicating modification contents of the modified place of the electronic document with the corresponding comment and store them, and the display control unit may control the display unit to further display the modification contents indicated by the modification content information.

Besides, in the document processing apparatus, the display control unit may control the display unit to further display relevant information relating to the comment.

Especially, in the document processing apparatus, the relevant information may be made a message exchanged on a bulletin board system in relation to the modification of the part of the contents of the electronic document.

Further, in the document processing apparatus, the attachment unit may attach the additional information to a position corresponding to the modified place.

According to an embodiment of the invention, a document processing method includes attaching, as additional information, a comment relating to a modification of a part of contents of an electronic document to the electronic document as a processing object, and associating, in a case where the part of the contents of the electronic document is modified in light of the comment, modified place information indicating a modified place with the comment to store them by a storage unit.

Accordingly, according to a document processing method, even in the case where there are plural modified places in the electronic document, a reason for modification of each of the modified places can be easily grasped.

In the document processing method, a display unit may be controlled to display the electronic document and to make the modified place distinguishable.

According to an embodiment of the invention, a storage medium readable by a computer, the storage medium storing a program of instructions executable by the computer to perform a function for document processing, the function including: attaching, as additional information, a comment relating to a modification of apart of contents of an electronic document to the electronic document as a processing object, and associating, in a case where the part of the contents of the electronic document is modified in light of the comment, modified place information indicating a modified place with the comment to store them by a storage unit.

According to the storage medium storing the program of the embodiment, even in the case where there are plural modified places in the electronic document, a reason for modification of each of the modified places can be easily grasped.

In the storage medium storing the program, the function may further include controlling a display unit to display the electronic document and to make the modified place distinguishable.

The entire disclosure of Japanese Patent Application No. 2004-207822 filed on Jul. 14, 2004 including specification, claims, drawings and abstract is incorporated herein by reference in its entirety.

What is claimed is:

1. A document processing system comprising:
   a document management server that manages a document, the document management server comprising:
   a processor; and
   a memory that stores a document database configured to store an electronic document and identification information of the electronic document in a record of the document database;
   an annotation management server that manages an annotation, the annotation management server comprising:
   a processor; and
   a memory that stores an annotation database configured to store identification information of the annotation, the identification information of the electronic document associated with the annotation, a first position in a body of the electronic document at which the annotation is provided on the electronic document, a uniform resource locator (URL) that identifies a location of a message that instructs a user to apply a modification to the electronic document, content of the modification to the electronic document applied by the user, and a second position at which the content of the modification is applied to electronic document,
   wherein the content of the modification comprises:
   a character string at the second position prior to application of the modification to the electronic document by the user; and
   a character string at the second position after application of the modification to the electronic document by the user; and
   a message shared server that manages a message, the message shared server comprising:
   a processor; and
   a memory that stores a message database configured to store the message.

2. The document processing system according to claim 1, wherein the message database is further configured to store a plurality of messages that instruct the user to apply a plurality of modifications to the electronic document.

3. The document processing system according to claim 2, wherein the message database is further configured to store identification information of the messages.

4. The document processing system according to claim 3, wherein the message database is further configured to store identification information of a previous message and identification information of a subsequent message, for each message, in records of the message database.

5. The document processing system according to claim 1, wherein the message database is further configured to store a title of the message.

6. The document processing system according to claim 5, wherein the title of the message indicates the modification to the electronic document to be applied by the user.

* * * * *